United States Patent [19]

Eckberg

[11] Patent Number: 4,977,198

[45] Date of Patent: Dec. 11, 1990

[54] UV CURABLE EPOXY FUNCTIONAL SILICONES

[75] Inventor: Richard P. Eckberg, Saratoga Springs, N.Y.

[73] Assignee: General Electric Company, Waterford, N.Y.

[21] Appl. No.: 171,498

[22] Filed: Mar. 21, 1988

[51] Int. Cl.[5] .......................... C08F 2/50; C08F 30/08; C08F 24/00; C08G 59/16

[52] U.S. Cl. .......................... 522/25; 522/14; 522/31; 522/99; 522/170; 528/26; 549/215

[58] Field of Search .................. 522/99, 148, 172, 170, 522/25, 31; 525/476; 528/26; 549/215

[56] References Cited

U.S. PATENT DOCUMENTS

| | | | |
|---|---|---|---|
| 4,026,705 | 5/1977 | Crivello | 522/31 |
| 4,081,492 | 3/1978 | Traenckner | 522/103 |
| 4,094,925 | 6/1978 | Jellinek | 522/103 |
| 4,279,717 | 7/1981 | Eckberg et al. | 204/159.13 |
| 4,421,904 | 12/1983 | Eckberg et al. | 528/27 |
| 4,534,838 | 8/1985 | Lin et al. | 522/99 |
| 4,547,431 | 10/1985 | Eckberg | 428/413 |
| 4,558,082 | 12/1985 | Eckberg | 524/104 |
| 4,576,999 | 3/1986 | Eckberg | 525/476 |
| 4,606,933 | 8/1986 | Griswold et al. | 522/99 |
| 4,640,967 | 2/1987 | Eckberg | 522/99 |

OTHER PUBLICATIONS

"Radiation Curable Silicones" R. P. Eckberg, undated manuscript.

*Primary Examiner*—Melvyn I. Marquis
*Assistant Examiner*—Arthur H. Koeckert
*Attorney, Agent, or Firm*—J. W. Harbour

[57] ABSTRACT

Epoxy functional organopolysiloxanes are compatibilized with onium salt photocatalysts by modifying a controlled number of epoxy groups by esterification with carboxylic acids.

15 Claims, No Drawings

UV CURABLE EPOXY FUNCTIONAL SILICONES

The present invention relates to UV curable epoxy functional silicones which are modified to increase their capacity to solubilize certain compounds necessary to their use. More particularly, the present invention relates to UV radiation curable epoxy functional silicones wherein a controlled number of epoxy groups are modified to increase the capacity to solubilize onium salt photoinitiators.

BACKGROUND OF THE INVENTION

UV radiation curable epoxy functional silicones are well known as are photocatalysts therefor. These silicones are utilized as adhesive release coatings, as coatings for optical fiber, as conformal coatings for electronic devices and so forth.

U.S. Pat. No. 4,576,999 to Eckberg discloses epoxy and/or acrylic functional polysiloxanes as UV radiation curable adhesive release coatings. The catalyst may be a photo-initiating onium salt and/or a free radical photoinitiating catalyst. U.S. Pat. Nos. 4,279,717 and 4,421,904 to Eckberg, et al., discloses epoxy functional diorganosiloxane fluids combined with iodonium salts to form UV radiation curable adhesive release compositions. U.S. Pat. No. 4,547,431 discloses epoxy functional diorganosiloxane combined with onium salt catalyst and polyfunctional epoxy monomers to also form an adhesive release coating. The polyfunctional epoxy monomer may be organic or silicone and is added to control release.

The combination of epoxy functional silicone and onium salt photocatalyst displays a fast non-inerted UV cure response. However, despite many positive features, the combination has significant shortcomings. Foremost among these shortcomings, the epoxy functional silicone has a limited capacity to solubilize certain dye sensitizers and onium salt photocatalysts, which reduces the effectiveness of these materials. The onium salts are a favored photocatalyst for epoxy materials, thus solubility of these salts in the composition to be cured is of significant interest.

It is an object of the present invention to improve the compatibility of epoxy functional silicone with onium salt catalyst.

It is yet another object of the present invention to improve performance and usefulness of epoxy functional silicones in combination with onium salt photocatalysts by simple modification of epoxy functions.

SUMMARY OF THE INVENTION

Briefly, there is provided by the present invention a UV radiation curable composition comprising a catalytic amount of onium salt photocatalyst and an epoxy functional organopolysiloxane having improved compatibility comprising in sufficient number to crosslink and cure the composition units of the formula:

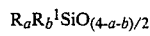

wherein R is hydrogen, $C_{(1-8)}$ alkyl, or aryl, $R^1$ is a monovalent epoxy functional organic radical of from 2 to 20 carbon atoms, a is 0, 1 or 2; b is 1, 2 or 3; and a+b is 1, 2 or 3, and in sufficient number to increase capacity to solubilize onium salts units of the formula:

wherein R is given above, $R^2$ is the epoxy esterification reaction product of $R^1$ with $HOOC-R^3$, $R^3$ is hydrogen or a $C_{1-20}$ substituted or unsubstituted hydrocarbon radical, c is 0, 1 or 2, d is 1, 2 or 3; and c+d is 1, 2 or 3.

DETAILED DESCRIPTION OF THE INVENTION

The compatible epoxy functional organopolysiloxane herein is easily and simply manufactured from base epoxy functional organopolysiloxanes. Base epoxy functional organopolysiloxanes by one method are produced by reacting organopolysiloxane hydrides with unsaturated epoxy groups in the presence of a platinum catalyst. The hydride may be present in the organopolysiloxane as $H_2SiO_{2/2}$ units, $HSiO_{3/2}$ units, $(CH_3)_2HSiO_{1/2}$ units, and/or preferably $(CH_3)HSiO_{2/2}$ units. The number of hydrides will determine the maximum number of epoxy functions present since the hydride will react with the unsaturation of the epoxy group and be replaced thereby.

Suitable unsaturated epoxy groups for use herein include vinyl or allylic functional epoxy compounds containing olefinic moieties such as allylglycidylether, glycidyl acrylate, vinyl norbornene monoxide, dicyclopentadiene monoxide and 4-vinylcyclohexeneoxide. Cyclohexeneoxide compounds are preferred. Base epoxy functional organopolysiloxanes and the production thereof are taught in U.S. Pat. Nos. 4,576,999 and 4,279,717, hereby incorporated by reference.

The molecular structure of the organopolysiloxane hydride will determine the structure of the base epoxy functional organopolysiloxane which will determine the structure of the compatible epoxy functional organopolysiloxane. Suitable molecular structures for the organopolysiloxane are resinous structures in which $SiO_{4/2}$ and/or $R^4SiO_{3/2}$ are combined with $R_3^4SiO_{1/2}$ and optionally $R_2^4SiO_{2/2}$; branched structures in which units of $R_2^4SiO_{2/2}$ predominate over units of $R^4SiO_{3/2}$; and linear structures where substantially all units are $R_2^4SiO_{2/2}$. $R^4$ stands for a substituted or unsubstituted organic radical. Linear structures for the organopolysiloxane are preferred. The linear organopolysiloxanes at low viscosity can easily be utilized for a variety of purposes and subsequently polymerized to a highly viscous or hard state.

The base epoxy functional organopolysiloxane should have from about 2% to about 40% by number units with epoxy functions based on total silicone units, and preferably from about 3 to 25% by number. To render the base epoxy functional organopolysiloxane more compatible with catalyst or other materials, a substantial number of epoxy functions should be modified by modifying reaction or epoxy esterification reaction with $HOOC-R^3$ where $R^3$ is a $C_{1-20}$ substituted or unsubstituted hydrocarbon radical. Generally from about 5% to about 60% by number of the epoxy functions and preferably from about 10% to 35% should be modified by such modifying reaction.

The modified epoxy functional organopolysiloxane should have from about 1 to about 20% by number epoxy functional silicone units and from about 1 to about 20% by number modified epoxy silicone units.

Schematically the desired modifying reaction takes place in the case of a cycloaliphatic epoxy functional organopolysiloxane as

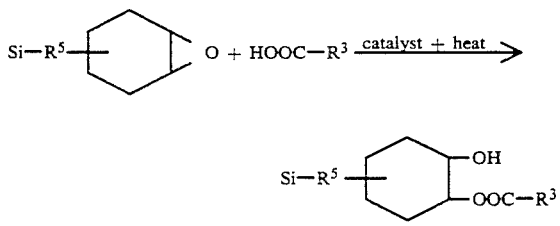

where $R^5$ is a divalent organic radical.

The modifying reaction is equivalent for glycidyl epoxies and so forth.

Suitable compounds of the formula HOOC—$R^3$ include aromatic acids such as benzoic acid; alkylene acids such as acrylic or methacrylic acid; and alkyl acids such as acetic acid, propionic acid, butyric acid and capric acid. It is believed that if $R^3$ is aromatic in character it will tend to increase the compatibility of the organopolysiloxane with compounds having aromatic characteristics to a greater degree. Analogously, if $R^3$ is alkyl or alkylene, compatibility will be better enhanced with compounds having these characteristics. Extending this reasoning, $R^3$ may be amine, amide, hydroxy, imide, etc. substituted to improve compatibility with specific substances. $R^3$ may be selected as desired to improve compatibility with a great number of compounds. Clearly the selection of $R^3$ must not detrimentally interfere with polymer manufacture or cure.

Suitable catalysts for modifying reaction of HOOC—$R^3$ with the base epoxy functional organopolysiloxane include tetraalkylureas and tetraalkylguanidines. Particularly effective are 1,1',3,3'-tetramethylurea and 1,1',3,3'-tetramethylguanidine. The amount is not critical and can range from as little as 0.01% by weight to 5.0% by weight or more based on the bulk reaction mass. Preferably the amount ranges from 0.1% to 2.0% by weight. The quantity of catalyst which is most effective for performing the epoxy/carboxylic acid esterification under a particular set of conditions can readily be determined by the skilled artisan without undue experimentation.

The modifying reaction is simply carried out by adding the desired stoichiometric amount of HOOC—$R^3$ plus catalyst to the base epoxy functional organopolysiloxane and heating. The temperature of the modifying reaction should range from 75° C. to about 150° C. for a time period of 0.5 hours to about 24 hours.

One method to produce the compatible epoxy functional organopolysiloxane has been detailed above. Another method is to pre-modify the unsaturated epoxy groups and subsequently to add the unsaturation to organopolysiloxane hydrides. Other methods to produce the compatible epoxy functional organopolysiloxane may occur to those skilled in the art.

The compatible epoxy functional organopolysiloxane may be blended or compounded with necessary and optional substances to produce curable compositions. Fillers, pigments, crosslinking agents or promoters, catalysts, UV absorbers, etc. will all find utility in compositions containing epoxy functional organopolysiloxane. Of particular importance to such compositions are the onium salt photocatalysts and consequently certain dye sensitizers to aid the photocatalyst.

The onium salt photocatalysts are well known, particularly for use with epoxy functional materials. Generally the onium salt photocatalysts may be divided into three classes, namely the halonium photocatalysts, the sulfonium photocatalysts, and the phosphonium photocatalysts.

The halonium salts are represented by the general formula:

$$[(R^6)_e(R^7)_fX]_g{}^+[MQ_h]^{-(h-i)}$$

where $R^6$ is a monovalent aromatic organic radical; $R^7$ is a divalent aromatic organic radical; X is a halogen, such as I, Br, Cl, etc.; M is a metal or a metalloid; Q is a halogen radical, such as Cl, F, Br, I, etc.; e is a whole number equal to 0 or 2; f is a whole number equal to 0 or 1; $e+f=2$ or the valence of X; $g=h-i$; i is the valence of M and is an integer from 2 to 7 inclusive; and h is greater than i and has a value up to and including 8. Preferred halonium salts are iodonium salts and are exemplified by 3-methoxyphenylphenyl-I$^+$ BF$_4^-$, 2-nitrophenyl - phenyl - I$^+$ BF$_4^-$, etc. The halonium salts are well known and are discussed further in U.S. Pat. Nos. 4,026,705 and 3,981,897, hereby incorporated by reference.

Similarly the sulfonium salts are represented by the general formula:

$$[(R^8)_j(R^9)_k(R^{10})_lX']_m{}^+[M'Q'_n]^{-(m-p)}$$

where $R^8$ is a monovalent aromatic organic radical; $R^9$ is a monovalent organic aliphatic radical selected from alkyl, cycloalkyl, and substituted alkyl; $R^{10}$ is a polyvalent organic radical forming a heterocyclic or fused ring structure selected from aliphatic radicals and aromatic radicals; X' is a group VIa element selected from sulfur, selenium and tellurium; M' is a metal or metalloid; Q' is a halogen radical, j is a whole number of 0, one, 2 or 3; k is a whole number of 0, one or 2; 1 is a whole number of 0 or one ; $j+k+l=3$ or the valence of X; $m=n-p$; p is the valence of M' and is an integer of from 2 to 7 inclusive; and n is greater than p and is an integer having a value up to 8. Consistent with the name given herein, it is preferred that X' be sulfur. Suitable sulfonium salts include triphenyl$^-$S$^+$ SbF$_6^-$,; 4-thiophenoxyphenyl-di- phenyl-S$^+$ SbF$_6^-$, tricyclodiphenylenephenyl-S$^+$ $^{BF}4^-$, benzoylmethyl-cyclo-butylene S$^+$ PF$_6^-$. Further sulfonium salts are disclosed in U.S. Pat. No. 4,161,478, hereby incorporated by reference.

The phosphonium salts may be represented by the formula:

$$[(R^{11})_q(R^{12})_r(R^{13})_sX'']_t{}^+[M''Q''_u]^{-(u-v)}$$

where $R^{11}$ is a monovalent aromatic organic radical selected from carbocyclic radicals and heterocyclic radicals; $R^{12}$ is a monovalent organic aliphatic radical selected from alkyl, alkoxy, cycloalkyl and substituted derivatives thereof; $R^{13}$ is a polyvalent organic radical forming an aromatic heterocyclic or fused ring structure with X''; X'' is a group Va element selected from N, P, As, Sb, and Bi; M'' is a metal or metalloid; Q'' is a halogen radical; q is a whole number equal to 0 to 4 inclusive; r is a whole number equal to 0 to 2 inclusive; s is a whole number equal to 0 to 2 inclusive; $q+r+s$ is a value equal to 4 or the valence of X''; $t=u-v$; v is the valence of M'' and is an integer of from 2 to 7 inclusive; and u is greater than v and is an integer having a value up to 8. X'' is preferably phosphorus as understood from the term phosphonium salt. Phosphonium salts are represented by, for example, tetraphenyl-P$^+$ BF$_4^-$, triphenyl-benzoylmethyl-P+ AsF$_6^-$, dimethyl-phenylbenzoylmethyl-N+ BF$_4^-$. Phosphonium salts are further described in U.S. Pat. No. 4,069,055, hereby incorporated by reference.

Dye sensitizers to increase the effectiveness of the photocatalyst are understood to generally function by absorbing light of a spectrum which has little or no effect on the catalyst and releasing the absorbed light in a form to effect the photocatalyst. Thus, the use of the dye sensitizer results in better utilization of the energy available from the light source. Dyes which can be used in combination with the above described onium salts are cationic dyes, such as shown in Vol. 20, p. 194–7 of the Kirk-Othmer Encyclopedia, 2nd Edition, 1965, John Wiley & Sons, New York. Some of the cationic dyes which can be used are, for example, Acridine orange; C.I. 46005;
Acridine yellow; C.I. 46035;
Phosphine R; C.I. 46045;
Benzoflavin; C.I. 46065;
Setoflavin T; C.I. 49005.

In addition to the above basic dyes can also be used. Some of these basic dyes are shown in Vol. 7, p. 532–4 of Kirk-Othmer Encyclopedia, as cited above, and include:

Hematoporphyrin;
4,4'-bisdimethylaminobenzophenone and
4,4'-bisdiethylaminobenzophenone.

Also, suitable are xanthones, such as thioxanthone, 2-isopropyl thioxanthone, and aminoxanthene. Specific instances where dye sensitizers are employed as detailed in U.S. Pat. No. 4,026,705 hereby incorporated by reference.

Epoxy functional organic compounds are commonly utilized in the compatible epoxy functional organopolysiloxanes and onium salt photocatalyst compositions of the instant invention to modify cure performance and adhesion. These epoxy functional organic compounds include limoneneoxide, 4-vinylcyclohexeneoxide, allylglycidyl ether, 7-epoxy-1-octene, vinylcyclohexenedioxide, bis(2,3-epoxycyclopentyl)ether, 3,4-epoxycyclohexylmethyl-3,4-epoxycyclohexanecarboxylate, cresylglycidyl ether, butanedioldiglycidyl ether and the like. Mixtures of such epoxides are also suitable. These compounds may also be useful as reactive diluents.

The compatible epoxy functional organopolysiloxanes are conveniently blended into curable compositions by simply mixing with the onium salt photocatalyst and other ingredients as the skill in the art dictates. Of the onium photocatalysts there is generally required from about 0.1% to about 15% by weight based on the weight of curable composition. Of the dye sensitizers there may be employed any effective amount but generally from about 0.01 % to about 1.5% by weight, again based on the total curable composition. The epoxy functional organic compound where employed is generally in an amount of from 1% to about 50% and preferably from 2% to 20% by weight based on the epoxy functional organopolysiloxane present.

A curable silicone coating might contain herein 100 parts by weight compatible epoxy functional organopolysiloxane which is linear with a viscosity from 10 to 500,000 centipoise at 25° C.; optionally from 1 to 100 parts by weight a reinforcing or extending filler, optionally from 1 to 50 parts by weight an epoxy functional organic compound; from 0.1 to 15% by weight based on total composition an onium salt photocatalyst; and from 0.01% to 1.5% by weight a dye sensitizer based on total composition.

Thus, epoxy functional organopolysiloxanes may be made compatible, i.e. miscible with onium salt photocatalysts. The following examples are offered by way of illustration and not be way of limitation.

EXAMPLE 1

700 grams of a 62.5 centipoise base epoxy functional organopolysiloxane with an approximate structure MD$_3^E$D$_{20}$M where M=(CH$_3$)$_3$SiO$_{1/2}$, D$^E$=(4-ethylcyclohexeneoxide) (CH$_3$)SiO$_{2/2}$ and D=(CH$_3$)$_2$SiO$_{2/2}$ were weighed into a three liter flask with 700 grams toluene. On this portion of base epoxy functional organopolysiloxane there are approximately 1 g-mole of oxirane. To the contents of the flask there are subsequently added 60 grams (0.5 g-mole) benzoic acid, making the initial concentration of benzoic acid 4.1% by weight. This reaction mixture was refluxed at 117° C. for 19 hours, at which time 0.3% by weight benzoic acid was detected by titration. Stripping the batch of solvent, unreacted benzoic acid (via sublimation), and polymer light ends at 150° C. at 200 mm vacuum, afforded 740 grams of a 580 centipoise fluid product, N$_{25}^D$=1.4377 where initial fluid N$_{25}^D$=1.4245. The viscosity increase, change in N25 refractive index and a strong carbonyl band in the product IR spectrum are consistent with a final product having as approximate structure MD$_{1.5}^E$D$_{1.5}^B$D$_{20}$M where

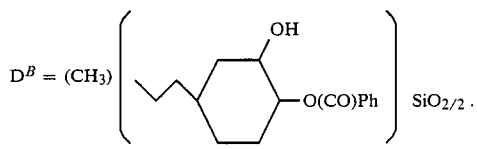

EXAMPLE 2

350 grams of base epoxy functional organopolysiloxane of Example 1 were weighed into a 3 liter flask with 100 grams toluene and 12.2 grams (0.1 g-mole) benzoic acid, then refluxed at 125° C. for 16 hours. Titration revealed less than 100 ppm benzoic acid remaining. Stripping as in Example 1 provided 360 grams of a 250 centipoise fluid product, N$_{25}^D$=1,4310. The approximate structure is taken to be MD$_{2.4}^E$D$_{0.6}^B$D$_{20}$M.

EXAMPLE 3

200 grams of base epoxy functional organopolysiloxane of Example 1 were weighed into a 1 liter flask with 10 grams acetic acid (0.167 moles). Refluxing this mixture for 8 hours at 120° C. reduced acetic acid concentration to less than 0.2% as determined by titration. Stripping afforded 205 grams of a 970 centipoise fluid product, N$_{25}^D$=1.4270. The approximate structure is taken to be MD$_{1.5}^E$D$_{1.5}^A$D$_{20}$M where

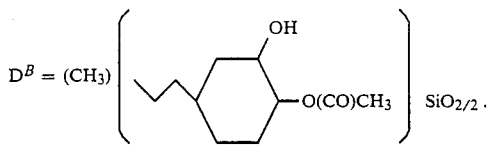

EXAMPLE 4

EXAMPLE 2 was followed using only 6 grams benzoic acid. Product proved to be a 170 cps fluid $N_{25}^D = 1.4280$, with the formula taken to be approximately $MD_{2.7}^E D_{-0.3}^B D_{20}M$.

EXAMPLES 5-8

Each of the modified epoxy functional organopolysiloxanes of Examples 1-4 were mixed with certain epoxy or polyol monomers to determine compatibility by blending 9 parts of the modified polymer with 1 part by weight monomer. An unmodified polymer of representative structure $M^E D_{84} D_6^E M^E$ is used as the control. The epoxy monomer DY23 is 3-methyl-phenylglycidyl ether and the epoxy monomer EPON 825 is BPA diglycidyl ether. HD is 2-ethyl-1,3-hexanediol. The designation I = immiscible and the designation M = miscible.

TABLE 1

| Example | Polymer | DY 23 | EPON 828 | HD |
|---|---|---|---|---|
| C | $M^E D_6^E D_{84} M^E$ | I | I | I |
| 5 | $MD_{2.7}^E D_{0.3}^B D_{20}M$ | I | I | M |
| 6 | $MD_{1.5}^E D_{1.5}^A D_{20}M$ | I | I | M |
| 7 | $MD_{2.4}^E D_{0.6}^B D_{20}M$ | M | I | M |
| 8 | $M^E_{1.5} D^B_{1.5} D_{20}M$ | M | M, partially | M |

EXAMPLES 9-12

An iodonium photocatalyst solution of $(C_{12}H_{25}Phenyl)_2I^+ SbF_6^-$ in 2-ethyl-1,3-hexanediol at a concentration of 6% Sb based on solvent was tested for miscibility in each of the above modified epoxy functional silicones and control. 9:1 by weight blends of polymer to photocatalyst solution were prepared and observed for miscibility.

TABLE 2

| Example | Polymer | Catalyst Solution |
|---|---|---|
| C' | $M^E D_6^E D_{84} M^E$ | I, opaque |
| 9 | $MD_{2.7}^E D_{0.3}^B D_{20}M$ | M, partially, hazy |
| 10 | $MD_{1.5}^E D_{1.5}^A D_{20}M$ | M |
| 11 | $MD_{2.4}^E D_{0.6}^B D_{20}M$ | M |
| 12 | $M^E_{1.5} D^B_{1.5} D_{20}M$ | M |

What is claimed is:

1. A UV radiation curable composition comprising:
(A) an epoxy functional organopolysiloxane comprising in sufficient number to crosslink and cure said composition units of the formula:

$$R_a R_b^1 SiO_{(4-a-b)/2}$$

wherein R is hydrogen, $C_{(1-8)}$ alkyl, or aryl, $R^1$ is a monovalent epoxy functional organic radical of from 2 to 20 carbon atoms, a is 0, 1, or 2; b is 1, 2 or 3, and a+b is 1, 2 or 3, and in sufficient number to increase capacity to solubilize component (B) modified units of the formula:

$$R_c R_d^2 SiO_{(4-c-d)/2}$$

wherein R is given above, $R^2$ is the epoxy esterification reaction product of $R^1$ with HOOC—$R^3$, $R^3$ is hydrogen, a $C_{1-20}$ substituted or unsubstituted alkyl radical, or a $C_{1-20}$ substituted or unsubstituted aromatic radical, c is 0, 1 or 2, d is 1, 2 or 3, and c+d is 1, 2 or 3; and
(B) a catalyst amount of onium salt photocatalyst.

2. The composition of claim 1 wherein said epoxy functional organopolysiloxane is substantially linear.

3. The composition of claim 1 wherein b and d are 1.

4. The composition of claim 1 wherein from about 1 to about 20% by number silicone units are epoxy functional silicone units and from about 1 to about 20% by number silicone units are modified epoxy functional silicone units.

5. The composition of claim 1 wherein said epoxy functional organopolysiloxane has a viscosity from 10 to 500,000 centipoise at 25° C.

6. The composition of claim 1 wherein HOOC—$R^3$ is selected from benzoic acid.

7. The composition of claim 1 wherein said onium salt photocatalyst is selected from halonium salts, sulfonium salts, and phosphonium salts.

8. The composition of claim 1 wherein there is from about 0.1% to about 15% by weight of onium photocatalyst based on total composition.

9. The composition of claim 1 wherein there is additionally employed an effective amount of dye sensitizer.

10. The composition of claim 9 wherein there is employed from about 0.01 to about 1.5% by weight dye sensitizer based on total composition.

11. The composition of claim 9 wherein said dye sensitizer is a thioxanthone or aminoxanthone.

12. The composition of claim 1 wherein there is additionally employed an epoxy functional organic compound in an effective amount to further crosslink.

13. The composition of claim 12 wherein there is employed from about 1 to about 50% by weight epoxy functional organic compound based on epoxy functional organopolysiloxane.

14. A UV radiation curable composition consisting essentially OF:
(A) an epoxy functional organopolysiloxane comprising in sufficient number to crosslink and cure said composition units of the formula:

$$R_a R_b^1 SiO_{(4-a-b)/2}$$

wherein R is hydrogen, $C_{(1-8)}$ alkyl, or aryl, $R^1$ is a monovalent epoxy functional organic radical of from 2 to 20 carbon atoms, a is 0, 1 or 2 carbon atoms, a is 0, 1 or 2, b is 1, 2 or 3, and a+b is 1, 2 or 3, and in sufficient number to increase capacity to solubilize component (B) modified units of the formula:

$$R_c R_d^2 SiO_{(4-c-d)/2}$$

wherein R is given above, $R^2$ is the epoxy esterification reaction product of $R^1$ with HOOC—$R^3$m $R^3$ is hydrogen or a $C_{1-20}$ substituted or unsubstituted hydrocarbon radical, c is 0, 1 or 2, d is 1, 2 or 3 and c+d is 1, 2 or 3; and
(B) a catalytic amount of onium salt photocatalyst,
(C) an effective amount of dye sensitizer, and
(D) an epoxy functional organic compound in an effective amount to further crosslink.

15. The composition of claim 1 wherein HOOC—$R^3$ is selected from acetic acid.

* * * * *